United States Patent [19]

Garthwaite et al.

[11] Patent Number: 5,717,938
[45] Date of Patent: Feb. 10, 1998

[54] CODED CARTRIDGES FOR ELECTRONIC BOOKS

[75] Inventors: Robert L. Garthwaite, Shamong; Sherri L. Meade, Moorestown, both of N.J.

[73] Assignee: Franklin Electronic Publishers, Incorporated, Mt. Holly, N.J.

[21] Appl. No.: 491,311

[22] Filed: Jun. 16, 1995

[51] Int. Cl.$^6$ .................. G09G 1/00; G06F 15/02
[52] U.S. Cl. .................. 395/751; 345/901; 345/905; 463/44; 463/45; 463/46; 463/4
[58] Field of Search .................. 345/168, 169, 345/172, 901–905; 364/709.14, 709.1, 709.15; 395/751; 463/2, 3, 4, 5, 6, 7, 8, 44, 95, 96

[56] References Cited

U.S. PATENT DOCUMENTS 4,386,776  6/1983  Bromley .................. 463/4
5,181,029  1/1993  Kim .................. 341/20
5,601,489  2/1997  Komaki .................. 463/44

*Primary Examiner*—Gail O. Hayes
*Assistant Examiner*—Steven R. Yount
*Attorney, Agent, or Firm*—McAulay Fisher Nissen Goldberg & Kiel, LLP

[57] ABSTRACT

A hand held electronic book is adapted to receive any number of replaceable cartridges. Each cartridge holds an alternate text and requires a separate set of functions. A predetermined set of function keys on the keyboard of the electronic book at predetermined positions are color coded. Each cartridge of a set of replaceable cartridges has the same number of similarly positioned and similarly color coded key-like designations. These designations provide an indication of the new function that the corresponding key on the keyboard has when the book accesses the cartridge involved. Thus color and position are the codes used to select the function indicated on the cartridge to the key on the keyboard that performs the function.

6 Claims, 1 Drawing Sheet

CODED CARTRIDGES FOR ELECTRONIC BOOKS

BACKGROUND OF THE INVENTION

This invention relates to an electronic book in which a first text is built into the platform and in which various cartridges having alternate texts may be inserted into the book so that the user may use the alternate text rather than the platform text.

For example one platform contains as a built in text a dictionary and thesaurus. The dictionary and thesaurus can be accessed by a user entering inquiry words through a keyboard and reviewing outputs such as definitions and synonyms on a display screen.

An alternate text in a cartridge can be used and takes advantage of the platform, the keyboard, the screen and some of the programming. The cartridge is plugged into the platform. For example, a bible, a baseball encyclopedia, a general encyclopedia or a specialized dictionary may be provided in ROM in a cartridge that is plugged into the dictionary. When this is done and the user accesses the cartridge text, certain of the keys in the keyboard will either not be useable for the alternate text or will have to perform double functions.

Multiple function keys are known. But the space and layout on the keyboard of the hand held electronic books does not readily permit adequate identification of the alternate functions. In addition, where many types of alternate texts may be used with a single platform, it is not feasible to list the set of functions for each text on the keyboard.

Accordingly, it is a major purpose of this invention to provide a technique for designating the alternate functions of certain keys on the keyboard when one of a number of possible texts is accessed by the keyboard and screen.

BRIEF DESCRIPTION

In brief, this invention involves a technique to provide function indicia for a predetermined set of function keys in the keyboard of a hand held electronic book. The electronic book is adapted to receive any one of a set of replaceable cartridges, each cartridge holding an alternate text and requiring a variation in the functions that are accessed through some of the function keys on the keyboard. In order to permit the user to readily determine which function this predetermined set of function keys is to perform with the given cartridge, the function keys on the keyboard are color coded. The cartridge has the same number of similarly color coded key-like designations. In addition, the positioning of the color coded function keys in the keyboard is mimicked by the positioning of the color coded key-like designations on the cartridge. Each color coded key-like designation on the cartridge carries a legend indicating the function involved. When the cartridge is inserted into the electronic book, the corresponding function key in the keyboard is thus identified as the key to be used to access that function.

DESCRIPTION OF THE PREFERRED EMBODIMENTS

Figure 1:
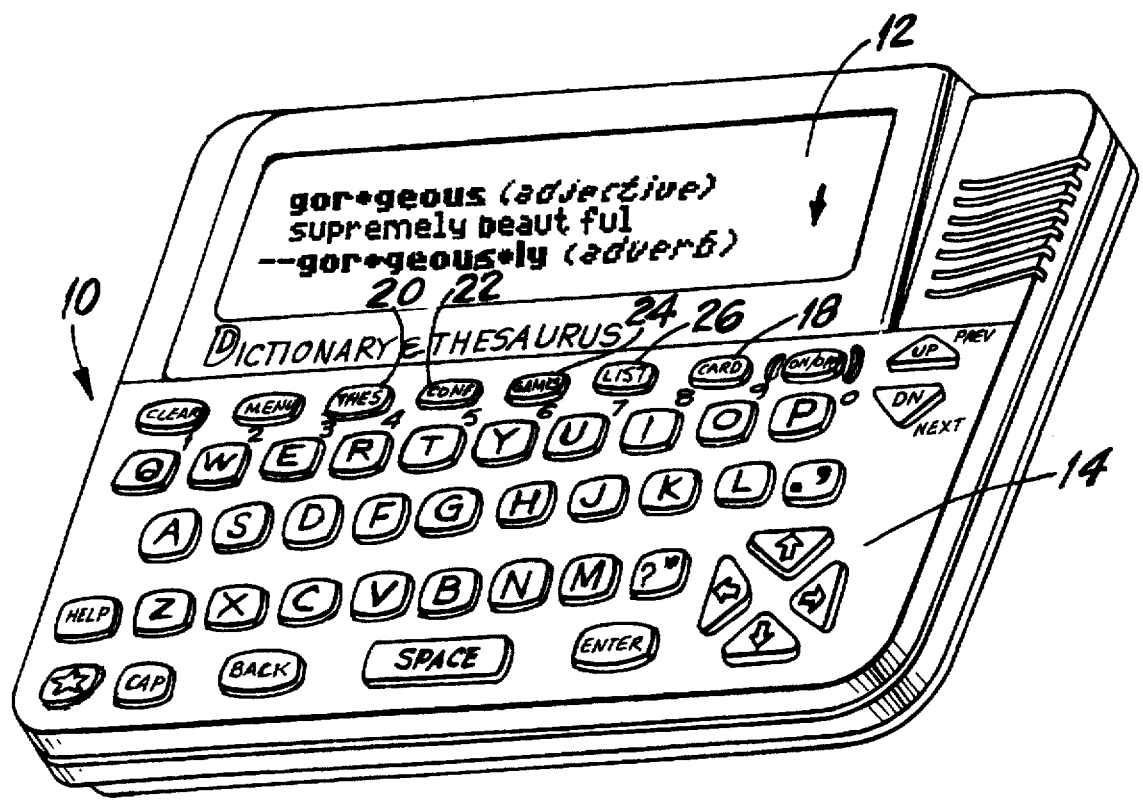
FIG. 1 is a perspective view of the platform of this invention showing the keyboard and display screen.
Figure 2:
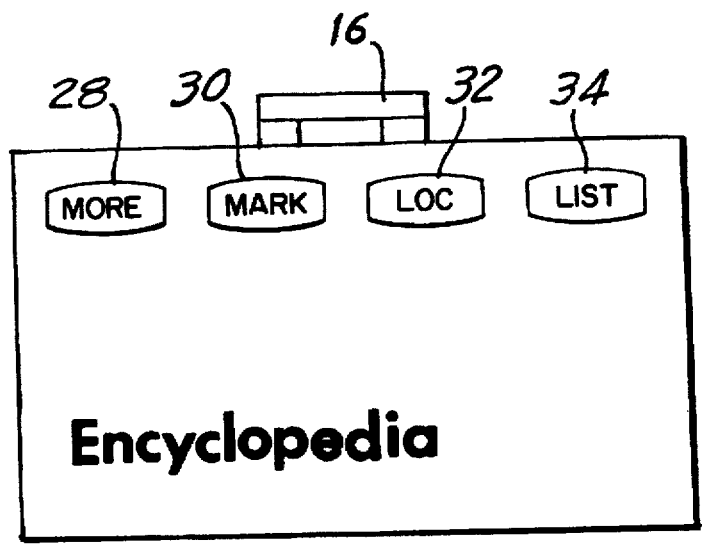
FIG. 2 is a perspective view of a typical cartridge that is adapted to be plugged into the FIG. 1 platform.

As shown in the figures, a platform 10 has a display screen 12 and a keyboard 14. Most of the keys in the keyboard perform functions that are generic to whatever text may be provided through the platform.

In the example, the platform has a built in dictionary and thesaurus.

However, through use of a cartridge slot (not shown) the cartridge 16 can be inserted into the platform so that when the key 18 labelled "Card" is pressed, the user will be able to access the text that is on the cartridge in lieu of the text that is built into the platform.

In order to use this alternate text and in particular to employ functions for the alternate text that differ from some of the functions of the text that is built into the platform, certain of the keys on the keyboard have to perform a different function. The cartridge provides the required programming as well as the ROM text so that these different functions can be performed.

In order for the user to access these functions, the software accessed by four keys 20, 22, 24 and 26 is designed so that the four keys can perform different functions depending upon the text involved.

Below is a table showing for each of a number of different texts, including the platform dictionary and thesaurus text, the functions of four specific keys, a red key 20, a green key 22, a yellow key 24 and a blue key 26.

| | Function Performed | | | |
|---|---|---|---|---|
| Title | Red Key 20 | Green Key 22 | Yellow Key 24 | Blue Key 26 |
| Merriam-Webster Dictionary & Thesaurus | THES | CONF | GAMES | LIST |
| Merriam-Webster Advanced Dictionary & Thesaurus | THES | CLASS | GAMES | LIST |
| Merriam-Webster Collegiate Dictionary | INFL | TABLE | GAMES | LIST |
| Merriam-Webster Speaking Dictionary | THES | SAY | GAMES | LIST |
| The Concise Columbia Encyclopedia | MORE | MARK | LOC | LIST |
| King James Version Holy Bible | MORE | MARK | NOTE | LIST |
| Diet & Nutrition Guide | FOOD | BRAND | TEXT | LIST |
| Parents' Emergency Medical Guide | INFO | — | — | — |
| Bartender's Guide | DRINK | GLOSS | HINT | HOW TO |
| Parker's Wine Guide | WINES | GLOSS | RGNS | MAPS |
| Betty Crocker's Cookbook | MORE | NUTR | INGR | LIST |
| Movie Views | CAST | DIR | GAMES | THEME |
| Total Baseball Encyclopedia | MAX | MIN | GT/LT | BAT/PIT |

When, for example, the Concise Columbia Encyclopedia cartridge is inserted, the red key 20 provides the function designated as MORE, the green function key 22 provides the function designated as MARK, the yellow function key 24 provides the function designated as LOC and the blue function key 26 provides the function designated as LIST. These function designations are described in the instructions for the particular cartridge. Thus MORE refers to a function of a more extensive search and MARK refers to a bookmark function which permits a user to mark selected ones of the entries found.

The four variable function keys 20, 22, 24 and 26 on the keyboard may be left either blank or may be marked with a function that relates to the text, if any, that is built into the platform. The important point is that these function keys 20, 22, 24 and 26 have four separate colors which correspond to four colors of the key-like indicia 28, 30, 32 and 34 on the cartridge and also that the sequence of the four keys 20, 22, 24 and 26 on the keyboard is the same as the sequence of the four key-like color coded indicia 28, 30, 32 and 34 on the cartridge. Thus, the combination of color and position/sequence facilitates the user's ability to readily use the appropriate functions for the cartridge that is inserted into the platform.

What is claimed is:

1. In a hand held electronic book having a platform with an input keyboard and a display screen, wherein any one of a substantial number of different texts can be accessed through a replacement cartridge insertable into the platform, the improvement in a coding technique for designating a predetermined number of functions appropriate to the text being accessed comprising:

a first set of function keys on the keyboard, each key having a predetermined color and a predetermined position, a cartridge access key on said keyboard to provide user access to the text of whatever cartridge is inserted into the platform, a set of different text carrying cartridges, each of said cartridges being adapted to be received in the platform to provide an associated text for access through the keyboard and screen, each of said cartridges having a predetermined set of indicia, each member of said set of indicia having color and position parameters corresponding to a separate one of said predetermined set of function keys, each indicia on each one of said cartridges carrying a legend indicating the new function of the corresponding function key on the keyboard when the cartridge is accessed through said cartridge access key.

2. The indicia arrangement of claim 1 wherein:

each of said function keys has a different distinct color and each of the corresponding one of said indicia on each of said cartridges has the matching color to the corresponding function key.

3. The indicia arrangement of claim 2 wherein:

the geometric deployment and sequence of said first set of function keys and of said indicia are the same.

4. The indicia arrangement of claim 1 wherein:

the number of members of said set of indicia on each of said cartridges is equal to the number of function keys in said first set of function keys.

5. The indicia arrangement of claim 2 wherein:

the number of members of said set of indicia on each of said cartridges is equal to the number of function keys in said first set of function keys.

6. The indicia arrangement of claim 3 wherein:

the number of members of said set of indicia on each of said cartridges is equal to the number of function keys in said first set of function keys.

* * * * *